(12) United States Patent
Kume et al.

(10) Patent No.: US 10,227,015 B2
(45) Date of Patent: Mar. 12, 2019

(54) POWER RECEPTION APPARATUS, VEHICLE, AND DETECTION METHOD

(71) Applicant: HONDA MOTOR CO., LTD., Tokyo (JP)

(72) Inventors: Yasuhisa Kume, Saitama (JP); Tomoaki Ono, Saitama (JP); Takuya Iwamoto, Saitama (JP); Hajime Fujita, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 12 days.

(21) Appl. No.: 15/632,646

(22) Filed: Jun. 26, 2017

(65) Prior Publication Data

US 2017/0368948 A1    Dec. 28, 2017

(30) Foreign Application Priority Data

Jun. 27, 2016 (JP) ................. 2016-126442

(51) Int. Cl.
| | |
|---|---|
| *H02J 7/00* | (2006.01) |
| *B60L 11/18* | (2006.01) |
| *H02J 50/90* | (2016.01) |
| *H02J 50/10* | (2016.01) |
| *H02J 50/40* | (2016.01) |
| *H02J 50/80* | (2016.01) |

(52) U.S. Cl.
CPC ......... *B60L 11/182* (2013.01); *B60L 11/1838* (2013.01); *H02J 7/0026* (2013.01); *H02J 7/0029* (2013.01); *H02J 50/10* (2016.02); *H02J 50/40* (2016.02); *H02J 50/80* (2016.02); *H02J 50/90* (2016.02); *Y02T 10/7055* (2013.01)

(58) Field of Classification Search
CPC ...................................... B60L 11/182
USPC ......................................... 320/108
See application file for complete search history.

(56) References Cited

U.S. PATENT DOCUMENTS

| | | | |
|---|---|---|---|
| 2014/0084697 A1 | 3/2014 | Yasuda et al. | |
| 2016/0107528 A1 | 4/2016 | Eppler et al. | |
| 2017/0368946 A1* | 12/2017 | Kume .............. | H02J 50/10 |

(Continued)

FOREIGN PATENT DOCUMENTS

| | | |
|---|---|---|
| JP | S52-065730 U1 | 5/1977 |
| JP | S53-019869 A | 2/1978 |
| JP | S58-083115 U1 | 6/1983 |

(Continued)

OTHER PUBLICATIONS

Feb. 13, 2018, Japanese Office Action issued for related JP Application No. 2016-126442.

*Primary Examiner* — Suresh Memula
(74) *Attorney, Agent, or Firm* — Paratus Law Group, PLLC

(57) ABSTRACT

The power reception apparatus includes a secondary coil which receives power in a non-contact state from a power transmission apparatus having a primary coil, while facing the power transmission apparatus, a housing which houses the secondary coil to form a space between the secondary coil and the housing, a fluid filled in the space, a sensor which is disposed in the space and detects a change in the a liquid level height of the fluid, and a detection unit which detects a breakage of the housing, based on a the change in the liquid level height detected by the sensor.

9 Claims, 8 Drawing Sheets

(56) References Cited

U.S. PATENT DOCUMENTS

2018/0106743 A1\* 4/2018 Vogt ...................... G01N 27/07

FOREIGN PATENT DOCUMENTS

| JP | S59-008309 A | 1/1984 |
|---|---|---|
| JP | S59-012019 U1 | 1/1984 |
| JP | H03-091904 A | 4/1991 |
| JP | H05-182838 A | 7/1993 |
| JP | 2009-004513 A | 1/2009 |
| JP | 2010-252498 A | 11/2010 |
| JP | 2011-062037 A | 3/2011 |
| JP | 2013-055229 A | 3/2013 |
| JP | 2015-065720 A | 4/2015 |
| JP | 2016-528715 A | 9/2016 |

\* cited by examiner

POWER RECEPTION APPARATUS, VEHICLE, AND DETECTION METHOD

CROSS-REFERENCE TO RELATED APPLICATION

This application claims priority from Japanese Patent Application No. 2016-126442 filed on Jun. 27, 2016, the entire contents of which are incorporated herein by reference.

TECHNICAL FIELD

The present invention relates to a power reception apparatus, a vehicle, and a detection method that utilize a non-contact power transmission technique.

BACKGROUND ART

As a technique for charging a battery mounted on a vehicle such as a hybrid car or an electric car driven by an electric motor, a non-contact power transmission technique considering the convenience at the time of charging has attracted attention. Patent literature 1 describes a vehicle provided with a power reception apparatus that utilizes a non-contact power transmission technique. The power reception apparatus has a structure in which a coil and a core unit are sealed with a resin member, and heat generated from the coil and the core unit can be dissipated to the outside through the resin member.

RELATED ART LITERATURE

Patent Literature

Patent Literature 1: JP-A-2015-65720

SUMMARY OF THE INVENTION

Problem that the Invention is to Solve

Since the power reception apparatus of patent literature 1 described above is fixed to a floor panel which is a bottom surface of the vehicle body, using bolts or the like, there is a possibility that the resin member for sealing the coil and the core unit receives a shock from the outside and breaks. The breakage of the resin member is not preferable because there is a possibility that problems such as degradation of the heat radiation performance or degradation of the power reception efficiency due to the impedance change may occur. However, in the power reception apparatus of patent literature 1, there is no disclosure or suggestion of a means for detecting a breakage or the like of the resin member.

An object of the present invention is to provide a power reception apparatus, a vehicle, and a detection method capable of cooling of a secondary coil and detection of breakage of a housing with a simple configuration.

Means for Solving the Problem

In order to achieve the above object, according to an embodiment of the present invention, there is provided a power reception apparatus, including:

a secondary coil (for example, a secondary coil 31) which receives power in a non-contact state from a power transmission apparatus (for example, a power transmission apparatus T) having a primary coil, while facing the power transmission apparatus;

a housing (for example, a housing 32) which houses the secondary coil to form a space (for example, a space S) between the secondary coil and the housing;

a fluid (for example, a fluid F) filled in the space;

a sensor (for example, a sensor 33) which is disposed in the space and detects a change in a liquid level height of the fluid; and a detection unit (for example, a detection unit 34) which detects a breakage of the housing based on the change in the liquid level height detected by the sensor.

According to an embodiment of the present invention, the housing includes a support unit (for example, a base plate 32a) which supports the secondary coil, and the support unit has a thermal conductivity which is higher than a thermal conductivity of the secondary coil.

According to an embodiment of the present invention, the housing includes the support unit (for example, the base plate 32a) which supports the secondary coil, and the support unit has a thermal conductivity which is higher than a thermal conductivity of the fluid.

According to an embodiment of the present invention, the support unit supports the sensor at an upper end in a vertical direction in the space.

According to an embodiment of the present invention, the sensor detects a change in a liquid level height of the fluid at a plurality of places in the space, and the detection unit detects a breakage of the housing in a case that all of the liquid level heights at the plurality of places change in the same direction.

According to an embodiment of the present invention, the detection unit detects a breakage of the housing in a case that all of the liquid level heights at the plurality of places drop.

According to an embodiment of the present invention, the power reception apparatus further includes:

a transmission unit which transmits a command to stop power transmission toward the secondary coil to the power transmission apparatus in a case that the detection unit detects a breakage of the housing.

There is provided a vehicle having the power reception apparatus according to an embodiment of the present invention.

There is provided a detection method performed by a power reception apparatus including:

a secondary coil (for example, a secondary coil 31) which receives power in a non-contact state from a power transmission apparatus (for example, a power transmission apparatus T) having a primary coil, while facing the power transmission apparatus;

a housing (for example, a housing 32) which houses the secondary coil to form a space (for example, a space S) between the secondary coil and the housing; and a fluid (for example, a fluid F) filled in the space, wherein the method includes the steps of:

detecting a change in a liquid level height of the fluid; and detecting a breakage of the housing based on the change in the detected liquid level height.

Advantage of the Invention

Since the space in the housing with the secondary coil housed therein is filled with the fluid, the secondary coil can be cooled by convection of the fluid. When the housing breaks, the fluid leaks out from the broken portion or air bubbles enter the space from the broken portion, and the liquid level height of the fluid changes. In an embodiment of the present invention, it is possible to detect a breakage of the housing from the change in liquid level height of the fluid by a sensor that detects the change in the liquid level height of the fluid. As described above, according to an embodiment of the present invention, it is possible to detect the cooling of the secondary coil and the breakage of the housing with a simple configuration at a low cost.

According to an embodiment of the present invention, the heat of the secondary coil can be dissipated to the outside via the support unit.

According to an embodiment of the present invention, the heat transmitted from the secondary coil to the fluid can be dissipated to the outside via the support unit.

According to an embodiment of the present invention, since the sensor is disposed at the upper end in the vertical direction of the space, it is possible to detect the initial liquid level drop of the fluid filled in the space. Therefore, breakage of the housing can be detected at an early stage. In other words, it is possible to improve the accuracy of detecting the breakage of the housing.

When the power reception apparatus is tilted with respect to the horizontal direction and the vertical heights of the plurality of sensors are different from each other, the liquid level heights of the fluid detected by each sensor are different from each other. When the breakage of the housing is detected based on a change in the liquid level height being detectable by at least one sensor, the breakage of the housing is erroneously detected. However, according to an embodiment of the present invention, since a breakage of the housing is detected in a case that all of the liquid level heights detected by sensors at a plurality of places change in the same direction, it is possible to prevent the erroneous detection in the tilted state of the power reception apparatus in the horizontal direction. Therefore, it is possible to improve the accuracy of detecting the breakage of the housing in the power reception apparatus.

According to an embodiment of the present invention, since the breakage of the housing is detected in a case that all the sensors detect the drop of the liquid level, it is possible to further improve the accuracy of the breakage detection of the housing in the power reception apparatus.

According to an embodiment of the present invention, when the breakage of the housing is detected, the power transmission to the secondary coil is stopped. Therefore, the safety can be improved.

MODE FOR CARRYING OUT THE INVENTION

Figure 1:
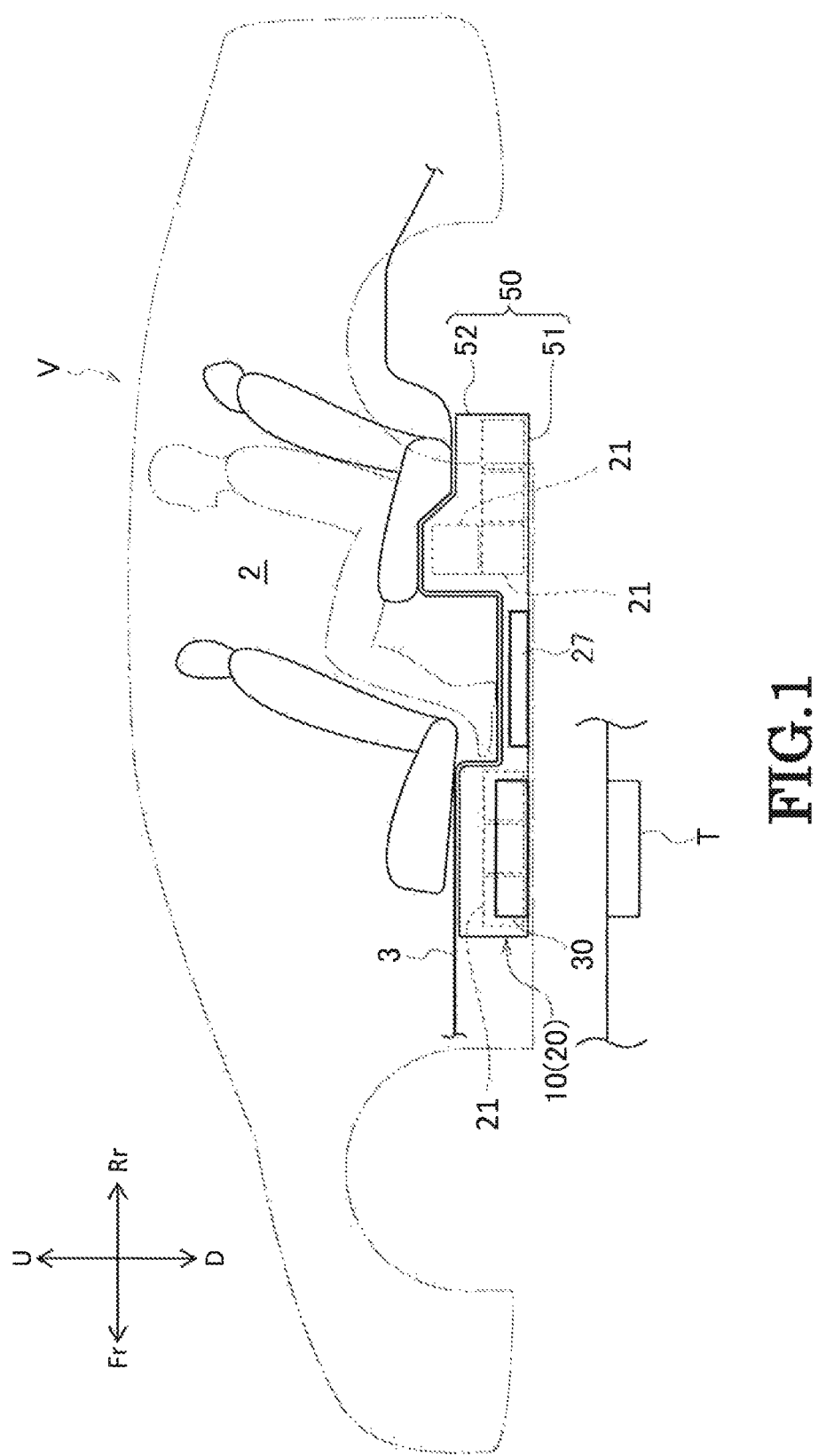
FIG. 1 is a schematic side view of a vehicle equipped with a power supply device including a power reception apparatus according to an embodiment of the present invention.

Hereinafter, embodiments of the present invention will be described with reference to the drawings. The drawings are to be seen in a sign direction. In the following description, front and rear, left and right, and up and down are in accordance with the direction seen from the driver. In the drawings, a front of the vehicle is indicated by Fr, a rear is indicated by Rr, a left side is indicated by L, a right side is indicated by R, an upper side is indicated by U, and a lower side is indicated by D.

As illustrated in FIG. 1, a power supply device 10 includes a battery unit 20 that houses a plurality of battery modules 21, a power reception apparatus 30 that receives AC power from a power transmission apparatus T in a non-contact manner, and a rectifier (not illustrated) for converting the power received by the power reception apparatus 30 from AC into DC and outputting the DC. The power supply device 10 is mounted on a vehicle V such as a hybrid vehicle or an electric vehicle. The vehicle V includes a floor panel 3 forming a floor surface of a passenger compartment 2. The power supply device 10 is disposed below the floor panel 3, that is, at the bottom of the vehicle V.

The battery unit 20 mainly includes a plurality of battery modules 21, a junction box 27, and a battery case 50 that houses them.

The battery case 50 is configured to include a bottom plate 51 on which the plurality of battery modules 21 and the junction box 27 are mounted, and a cover 52 that covers these elements from above. At least the bottom plate 51 of the battery case 50 is formed, using a material having thermal conductivity and magnetic shielding properties. Further, in the battery case 50, a plurality of brackets (not illustrated) extending in the left-right direction is fastened to a floor frame (not illustrated) provided on both sides of the vehicle V, so that the battery unit 20 is mounted to be suspended below the floor panel 3.

The junction box 27 is a box body which houses a plurality of terminals used when coupling, branching or relaying the lead wires, and a safety device such as a fuse or a breaker.

Figure 2:
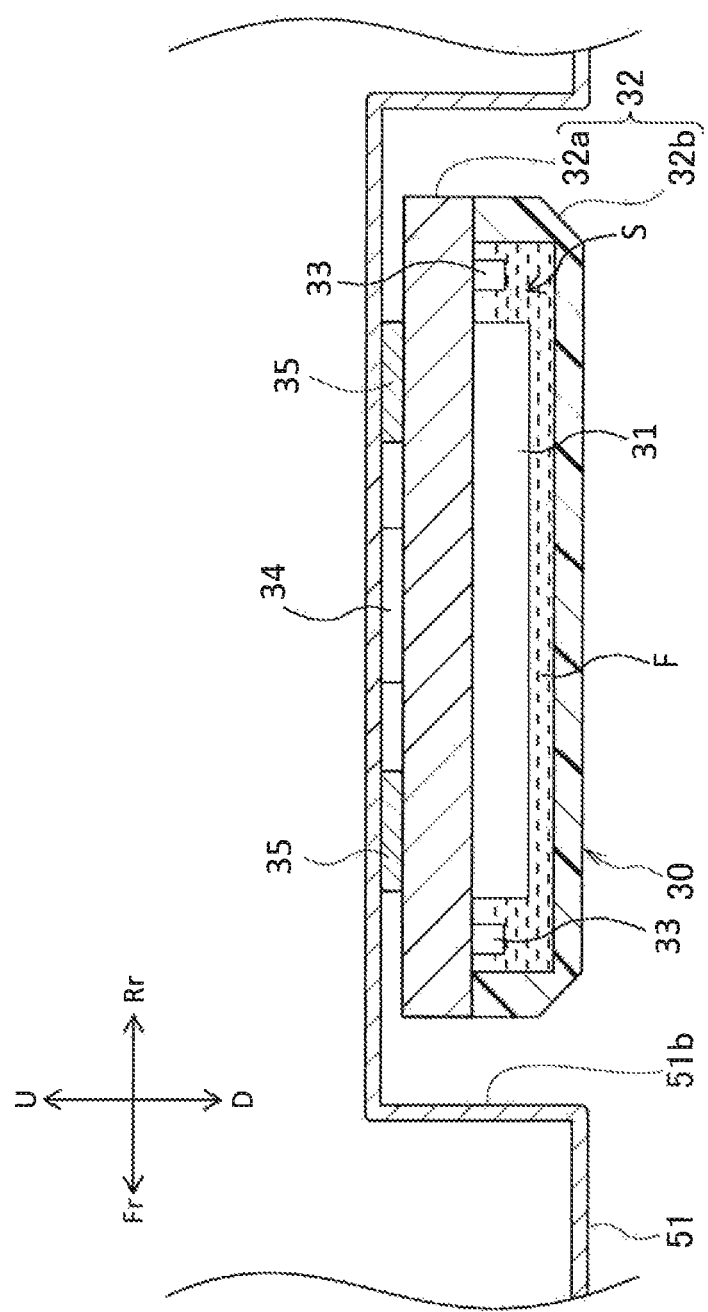
FIG. 2 is a cross-sectional view of the power reception apparatus according to the embodiment of the present invention as seen from the side.

The power reception apparatus 30 is disposed at the bottom of the power supply device 10 and at the bottom of the vehicle V. The power reception apparatus 30 receives the AC power transmitted through a primary coil (not illustrated) of the power transmission apparatus T connected to the external power system, using the non-contact power transmission technique. As illustrated in FIG. 2, the power reception apparatus 30 includes a secondary coil 31, a housing 32 that houses the secondary coil 31 to form a space S between the housing 32 and the secondary coil 31, two sensors 33 and 33 disposed inside the space S, and a detection unit 34. The space S is filled with an insulating fluid F.

The secondary coil 31 is a coil that receives the power from the power transmission apparatus T in a non-contact manner, and when the primary coil of the power transmission apparatus T is AC excited with the power reception apparatus 30 facing the secondary coil 31, AC flows through the secondary coil 31 by the action of the electromagnetic induction.

The housing 32 is made up of a base plate 32a that supports the secondary coil 31, and a resin cover 32b that covers the secondary coil 31 from below. The base plate 32a is formed, using a material having a thermal conductivity higher than that of the secondary coil 31 or the insulating fluid F, for example, aluminum. As illustrated in FIG. 2, the base plate 32a supports the sensor 33 at the uppermost portion (upper end) in the vertical direction in the space S.

The sensor 33 is a level meter that detects a change in the liquid level height of the insulating fluid F filled in the space S. The sensors 33 are arranged at two different positions in the front-rear direction of the vehicle V. The sensor 33 is a level meter such as a float type, a capacitance type, an electrode type, or the like. The level meter of the float type includes a magnet enclosed in the float, and a reed switch fixed in the stem. By turning the reed switch on and off by the vertical movement of the float using the stem as a guide, the liquid level drop or liquid level rise is detected. In addition, the capacitance type level meter detects the liquid level drop or the liquid level rise, by measuring the difference between the intrinsic dielectric constant of the insulating fluid F and the dielectric constant of air. The electrode type level meter detects the liquid level drop or the liquid level rise, by measuring the resistance value between a plurality of electrodes.

Figure 3:
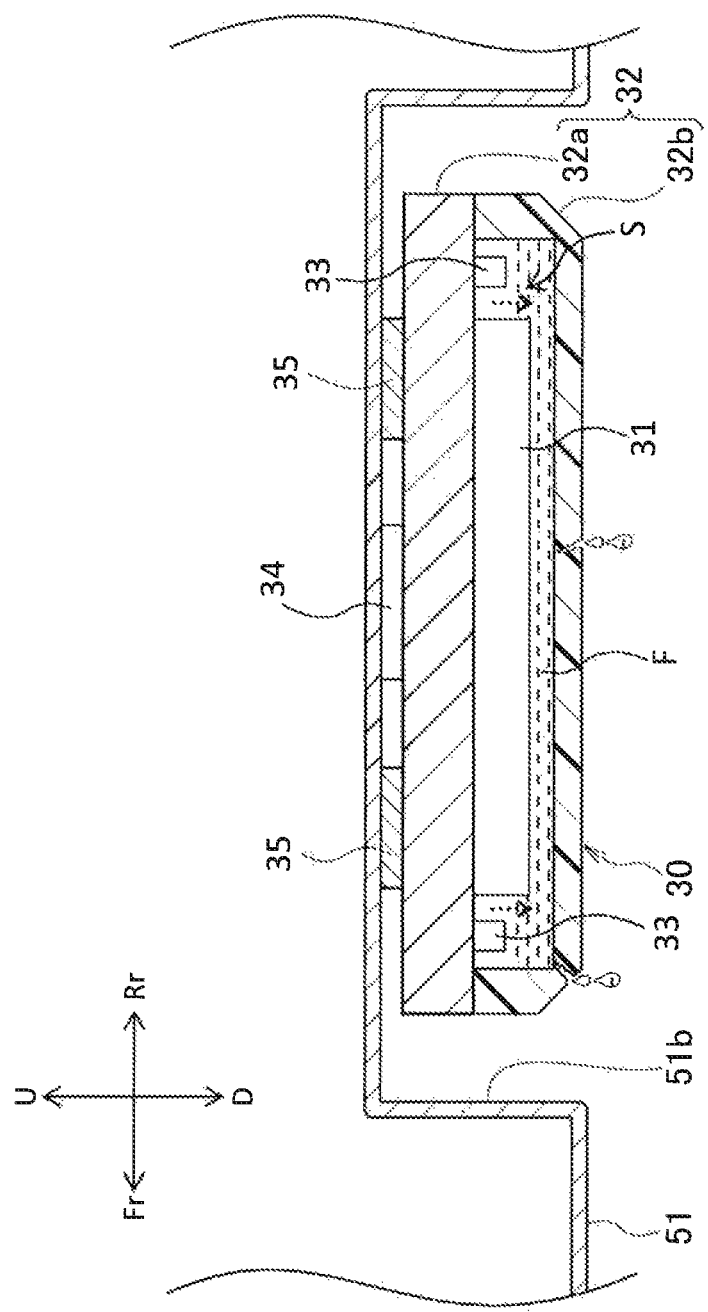
FIG. 3 is a cross-sectional view of the power reception apparatus in a state in which a resin cover is broken and a liquid level is lowered, as viewed from the side.
Figure 4:
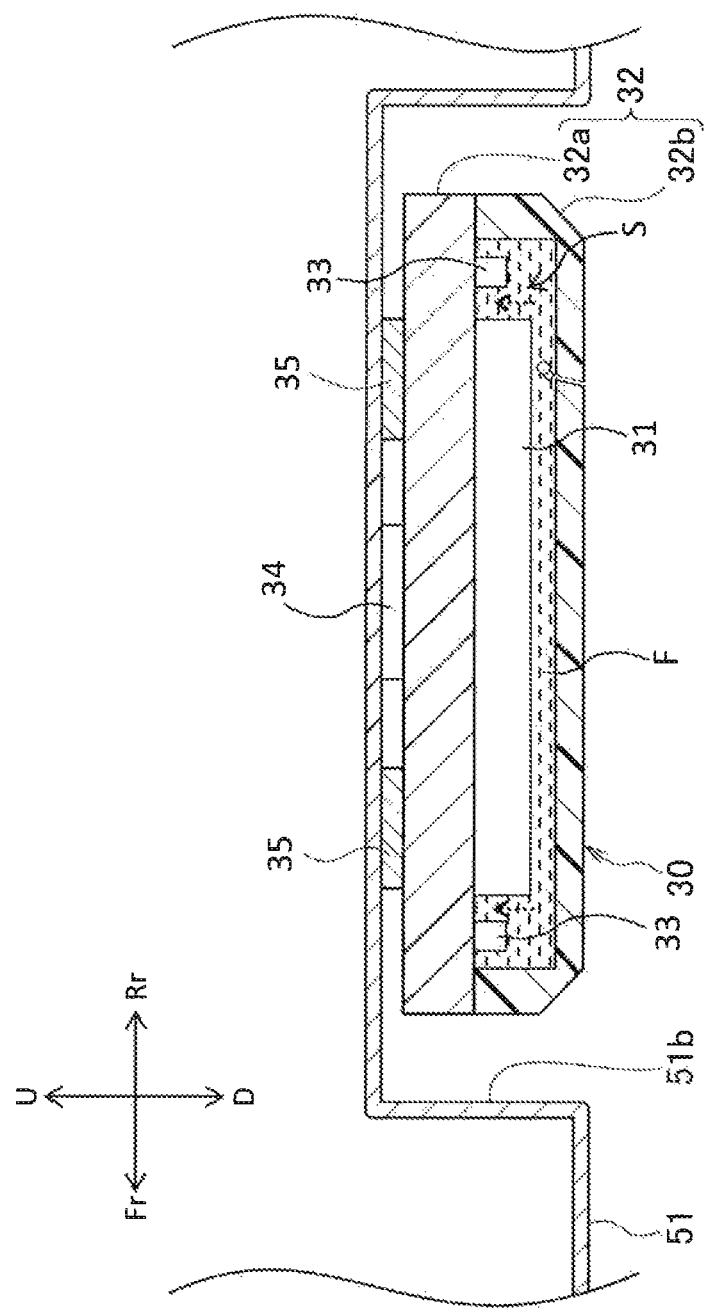
FIG. 4 is a cross-sectional view of the power reception apparatus viewed from a side in a state in which a crack occurs in the resin cover and the liquid level rises.

In accordance with the detection result of the sensor 33, the detection unit 34 detects breakage of the housing 32, particularly, the resin cover 32b. Since the power reception apparatus 30 is disposed at the bottom of the vehicle V, there is a possibility that the resin cover 32b may be broken by collision with protrusions or the like provided on the road surface. When the resin cover 32b is broken, the insulating fluid F filled in the space S may leak from the broken portion, and the liquid level height may decrease as indicated by a dotted arrow in FIG. 3. Further, if the breakage of the resin cover 32b is a crack or the like, liquid leakage does not occur due to the viscosity of the insulating fluid F, but air bubbles are mixed into the space S from the broken portion, and as illustrated by the dotted arrow in FIG. 4, the liquid level height may increase. Therefore, the detection unit 34 detects breakage of the resin cover 32b of the housing 32, based on the change in the liquid level height detected by the sensor 33.

Figure 5:
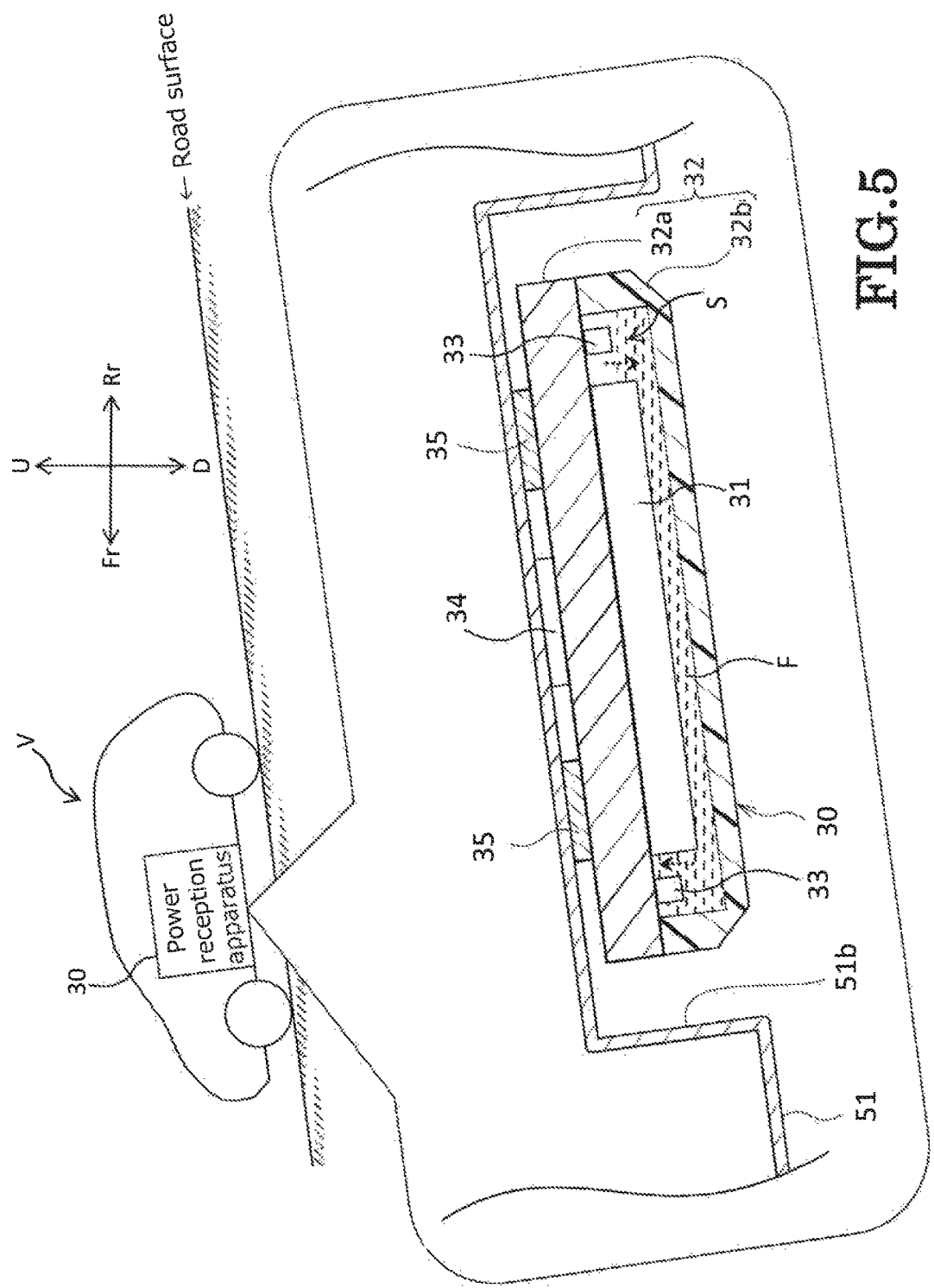
FIG. 5 is a cross-sectional view of the power reception apparatus in which the resin cover is not broken as seen from the side, in a state in which the vehicle is on a road surface with a gradient.
Figure 6:
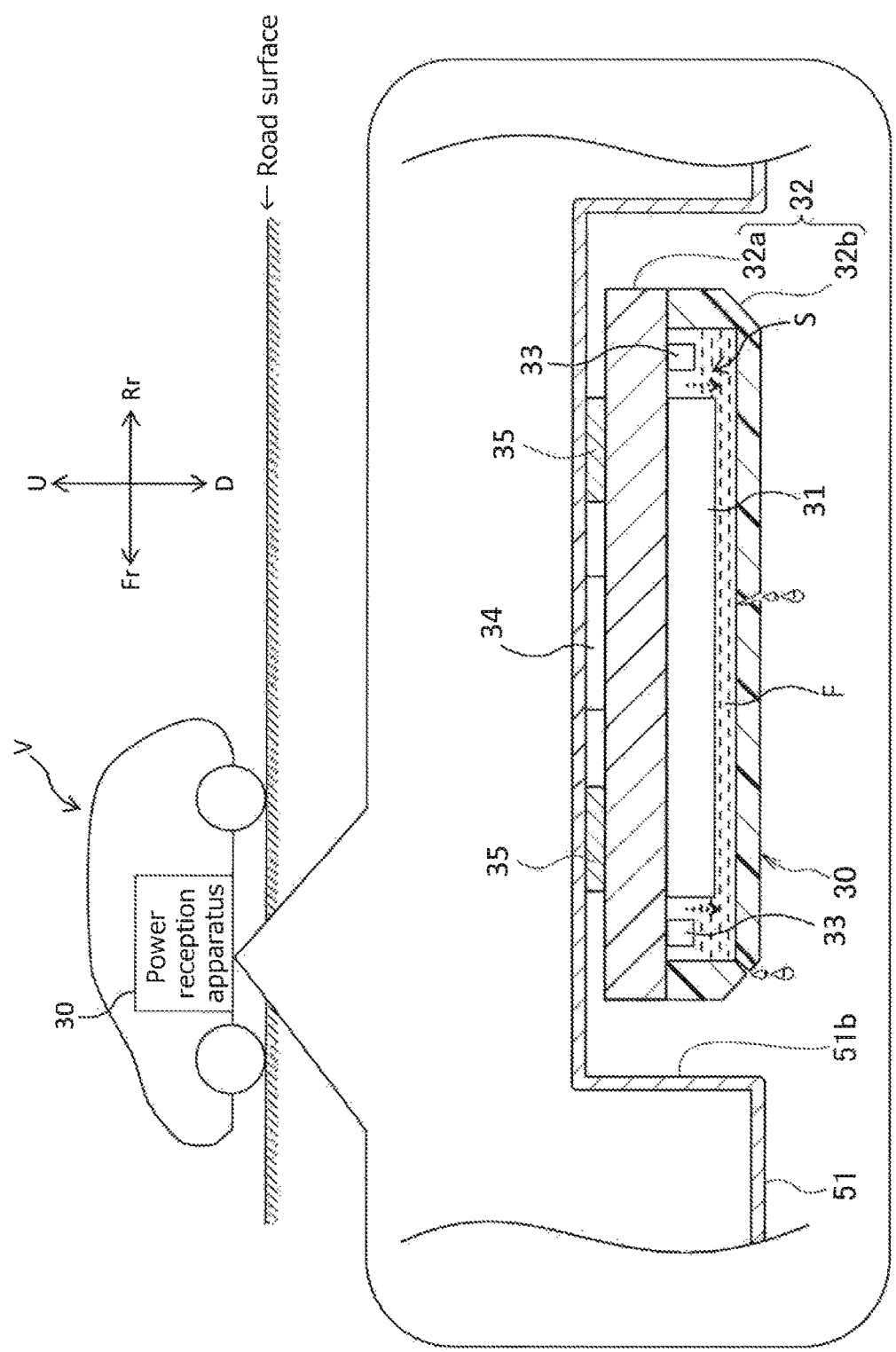
FIG. 6 is a cross-sectional view of the power reception apparatus in which the resin cover is broken as seen from the side, in a state in which the vehicle is on a flat road surface.

However, the liquid level height of the insulating fluid F also varies depending on the inclination of the vehicle V including the power reception apparatus 30 with respect to the horizontal direction. That is, as illustrated in FIG. 5, in the case where the vehicle V is present on a road surface having a gradient, one of the two sensors 33 and 33 of the power reception apparatus 30 detects a liquid level drop, while the other sensor detects the rise of the liquid level. However, the change in the liquid level height is not caused by the breakage of the resin cover 32b. In the present embodiment, as illustrated in FIG. 6, in the case that the two sensors 33 and 33 detect a change in the liquid level height in the same direction, the detection unit 34 detects the breakage of the resin cover 32b of the housing 32. That is, the detection unit 34 determines that the resin cover 32b of the housing 32 is broken in the case that both of the detection results of the two sensors 33 and 33 are the liquid level drop or the liquid level rise. The degree of increase in the liquid level height due to mixing of air bubbles when cracks occur in the resin cover 32b is not as great as the degree of the drop in the liquid level height due to liquid leakage when the resin cover 32b is broken. Therefore, the detection unit 34 may determine that the resin cover 32b of the housing 32 is broken only when the detection results of the two sensors 33 are both the liquid level drop.

When the detection unit 34 detects the breakage of the resin cover 32b of the housing 32, a transmission unit (not illustrated) provided in the vehicle V transmits a command to stop power transmission toward the secondary coil 31 to the power transmission apparatus T. Upon receiving the command, the power transmission apparatus T stops the AC excitation of the primary coil in order to ensure safety.

Figure 7:
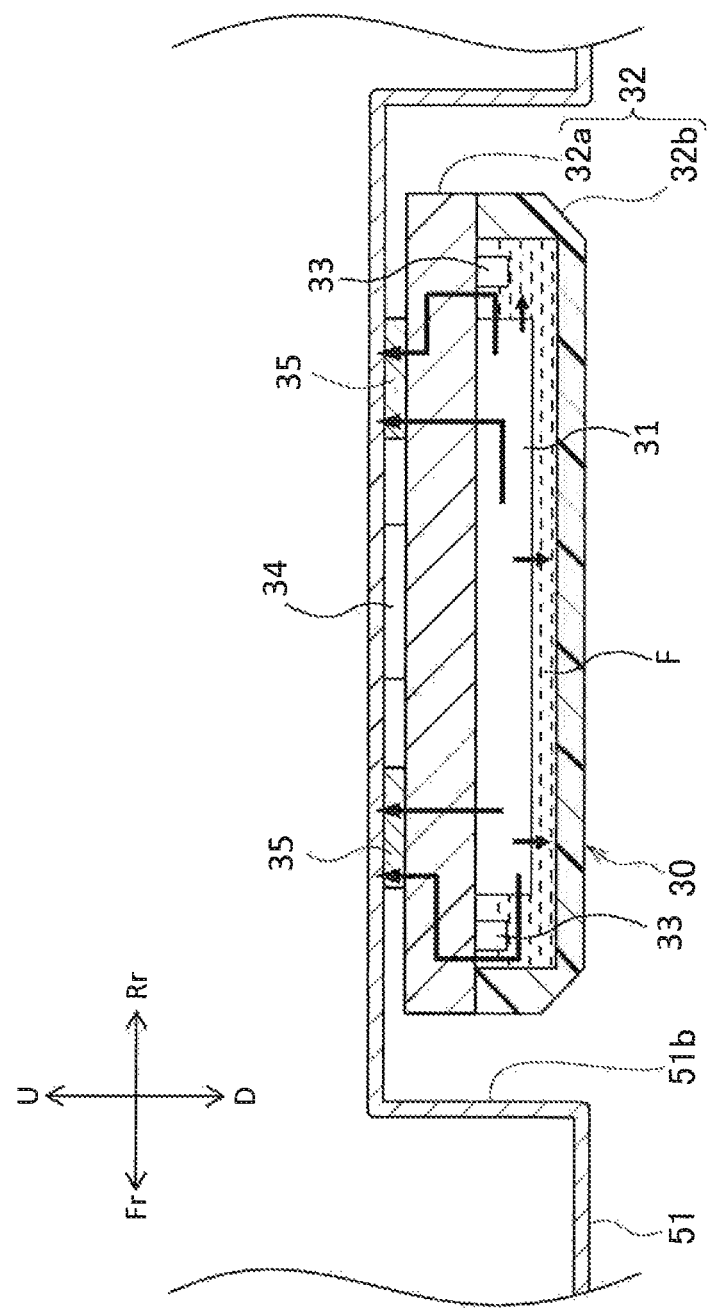
FIG. 7 is a schematic diagram illustrating a heat conduction path in the power reception apparatus.

The power reception apparatus 30 is disposed on the lower surface side of the bottom plate 51 of the battery case 50. A heat radiation sheet 35 is disposed on the upper surface of the housing 32 of the power reception apparatus 30. As illustrated in FIG. 7, the heat generated in the secondary coil 31, which is the main heat source of the power reception apparatus 30, is directly conducted to the base plate 32a, which is overwhelmingly higher in thermal conductivity than the secondary coil 31 and the insulating fluid F, or is conducted to the base plate 32a via the insulating fluid F that convects in the space S. The heat conducted to the base plate 32a is transmitted to the bottom plate 51 having a larger heat capacity than the power reception apparatus 30 via the heat radiation sheet 35.

The rectifier has a rectifier circuit that converts the input AC to DC and outputs the DC, the input side thereof is connected to the power reception apparatus 30, and the output side thereof is connected to the junction box 27. As a result, the power received by the power reception apparatus 30 is input to the rectifier, is converted from AC to DC therein, and then is charged in the battery module 21 via the junction box 27.

As described above, according to the present embodiment, since the insulating fluid F is filled in the space S in the housing 32 with the secondary coil 31 housed therein, the secondary coil 31 can be cooled by convection of the insulating fluid F. When the resin cover 32b of the housing 32 is broken, the insulating fluid F leaks from the broken portion, or air bubbles enter the space S from the broken portion, and the liquid level height of the insulating fluid F changes. Since the power reception apparatus 30 of the present embodiment has the sensor 33 for detecting the change in the liquid level height of the insulating fluid F, it is possible to detect the breakage of the resin cover 32b of the housing 32 from the change in the liquid level height of the insulating fluid F. In this way, the detection of the cooling of the secondary coil 31 and the breakage of the housing 32 can be achieved at a low cost with a simple configuration.

Further, since the thermal conductivity of the base plate 32a supporting the secondary coil 31 is higher than that of the secondary coil 31, the heat of the secondary coil 31 can be dissipated to the outside via the base plate 32a. Since the thermal conductivity of the base plate 32a is higher than that of the insulating fluid F, the heat transmitted from the secondary coil 31 to the insulating fluid F can be radiated to the outside via the base plate 32a.

Figure 8:
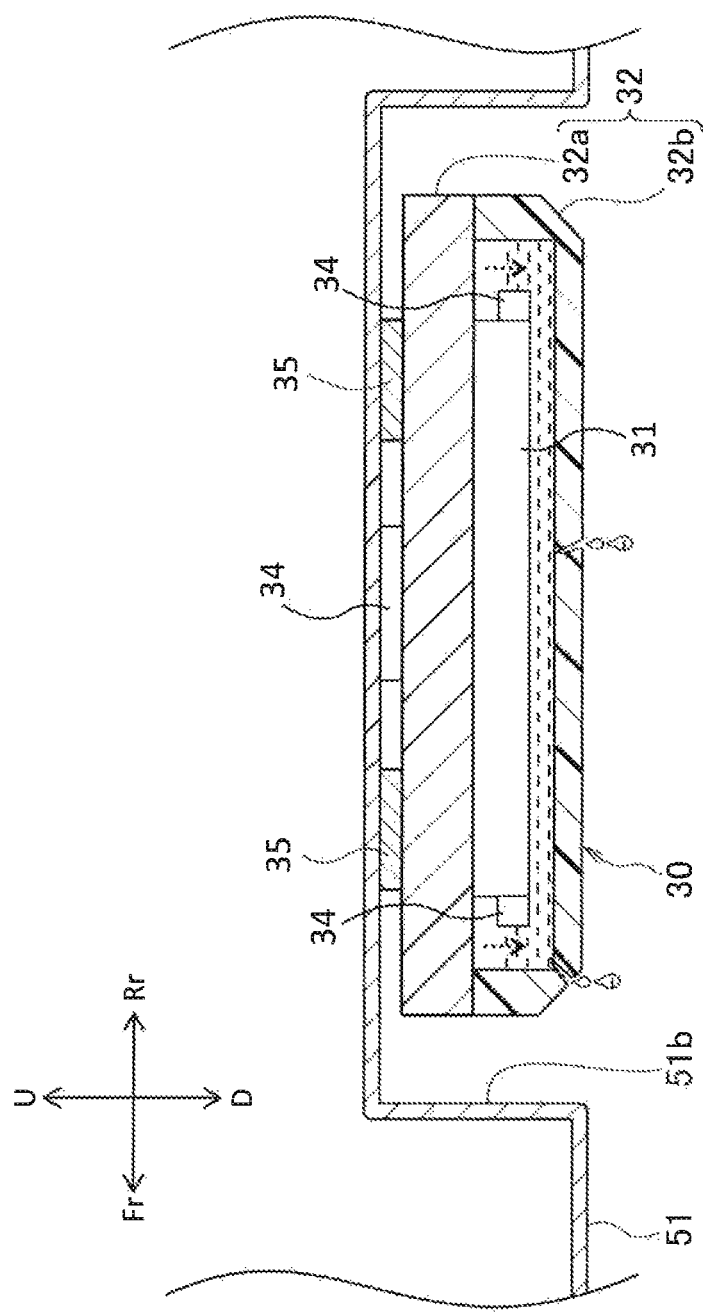
FIG. 8 is a view illustrating a state in which the resin cover of the power reception apparatus in a form in which a sensor is positioned downward in a vertical direction is broken and the liquid level drops.

Further, as illustrated in FIG. 2, the sensor 33 is disposed at the upper end in the vertical direction of the space S. If the position of the sensor 33 in the vertical direction is downward as illustrated in FIG. 8, it is not possible to detect the initial liquid level drop of the fluid filled in the space. However, in the present embodiment, since the sensor 33 is disposed at the upper end in the vertical direction of the space S, it is possible to detect the initial liquid level drop of the fluid filled in the space S, and the breakage of the housing 32 can be detected at an early stage. In other words, it is possible to improve the accuracy of detecting the breakage of the housing 32.

Further, the two sensors 33 and 33 are respectively disposed at two different places in the front-rear direction of the vehicle V. Since the breakage of the resin cover 32b of the housing 32 is detected in the case that the liquid level heights of the insulating fluid F detected by the two sensors 33 and 33 are both changed in the same direction, it is possible to prevent an erroneous detection in a state in which the power reception apparatus 30 is tilted with respect to the horizontal direction. Therefore, it is possible to improve the accuracy of detecting the breakage of the housing 32 in the power reception apparatus 30. Further, when the resin cover 32b of the housing 32 is broken, there is a high possibility that the liquid level drops rather than rising. Therefore, the breakage of the housing 32 is detected in the case that both of the two sensors 33 and 33 detect the drop of the liquid level, it is possible to further improve the accuracy of detecting the breakage of the housing 32 in the power reception apparatus 30.

Further, when the breakage of the housing 32 is detected, the power transmission apparatus T is instructed to stop power transmission toward the secondary coil 31, thereby making it possible to improve the safety of the power reception apparatus 30 side.

Further, the present invention is not limited to the above-described embodiments, but may be appropriately modified, improved, and the like.

DESCRIPTION OF REFERENCE NUMERALS AND CHARACTERS 2 passenger compartment
3 floor panel
10 power supply device
20 battery unit
21 battery module
27 junction box
30 power reception apparatus
31 secondary coil
32 housing
32a base plate
32b resin cover
33 sensor
34 detection unit
35 heat radiation sheet
50 battery case
51 bottom plate
52 cover
F insulating fluid
S space
T power transmission apparatus
V vehicle

The invention claimed is:
1. A power reception apparatus, comprising:
a secondary coil which receives power in a non-contact state from a power transmission apparatus having a primary coil, while facing the power transmission apparatus;
a housing which houses the secondary coil to form a space between the secondary coil and the housing;
a fluid filled in the space;
a sensor which is disposed in the space and detects a change in a liquid level height of the fluid; and
a detection unit which detects a breakage of the housing based on the change in the liquid level height detected by the sensor.

2. The power reception apparatus according to claim 1, wherein the housing includes a support unit which supports the secondary coil, and
the support unit has a thermal conductivity which is higher than a thermal conductivity of the secondary coil.

3. The power reception apparatus according to claim 1, wherein the housing includes the support unit which supports the secondary coil, and
the support unit has a thermal conductivity which is higher than a thermal conductivity of the fluid.

4. The power reception apparatus according to claim 2, wherein the support unit supports the sensor at an upper end in a vertical direction in the space.

5. The power reception apparatus according to claim 1, wherein the sensor detects a change in a liquid level height of the fluid at a plurality of places in the space, and
the detection unit detects a breakage of the housing in a case that all of the liquid level heights at the plurality of places change in the same direction.

6. The power reception apparatus according to claim 5, wherein the detection unit detects a breakage of the housing in a case that all of the liquid level heights at the plurality of places drop.

7. The power reception apparatus according to claim 1, further comprising:
a transmission unit which transmits a command to stop power transmission toward the secondary coil to the power transmission apparatus in a case that the detection unit detects a breakage of the housing.

8. A vehicle having a power reception apparatus, the power reception apparatus comprising:
a secondary coil which receives power in a non-contact state from a power transmission apparatus having a primary coil, while facing the power transmission apparatus;
a housing which houses the secondary coil to form a space between the secondary coil and the housing;
a fluid filled in the space;
a sensor which is disposed in the space and detects a change in a liquid level height of the fluid; and
a detection unit which detects a breakage of the housing based on the change in the liquid level height detected by the sensor.

9. A detection method performed by a power reception apparatus including:
a secondary coil which receives power in a non-contact state from a power transmission apparatus having a primary coil, while facing the power transmission apparatus;
a housing which houses the secondary coil to form a space between the secondary coil and the housing; and
a fluid filled in the space,
wherein the method includes the steps of:
detecting a change in a liquid level height of the fluid; and
detecting a breakage of the housing based on the change in the detected liquid level height.

* * * * *